United States Patent
Nishimura

(10) Patent No.: US 7,944,183 B2
(45) Date of Patent: May 17, 2011

(54) OUTPUT VOLTAGE CONTROLLER FOR AC VEHICLE GENERATOR

(75) Inventor: Shinji Nishimura, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/094,536

(22) PCT Filed: Mar. 7, 2006

(86) PCT No.: PCT/JP2006/304375
§ 371 (c)(1),
(2), (4) Date: May 21, 2008

(87) PCT Pub. No.: WO2007/102203
PCT Pub. Date: Sep. 13, 2007

(65) Prior Publication Data
US 2009/0212625 A1    Aug. 27, 2009

(51) Int. Cl.
*H02P 11/00* (2006.01)
*H02P 9/00* (2006.01)
*H02H 7/06* (2006.01)
*H02P 9/26* (2006.01)
*B61D 43/00* (2006.01)
*F02B 61/04* (2006.01)
*F02B 67/06* (2006.01)

(52) U.S. Cl. .................. 322/28; 322/25; 322/73; 290/3; 123/198 R

(58) Field of Classification Search .................. 322/25, 322/28, 73; 290/3; 123/198 R
See application file for complete search history.

(56) References Cited

U.S. PATENT DOCUMENTS

| | | | | |
|---|---|---|---|---|
| 2,500,749 A | * | 3/1950 | Gurewitsch | 315/503 |
| 2,914,718 A | * | 11/1959 | Baude | 318/707 |
| 3,016,515 A | * | 1/1962 | Summers et al. | 340/447 |
| 3,225,335 A | * | 12/1965 | Glenn et al. | 365/126 |
| 3,254,293 A | * | 5/1966 | Steinbruegge et al. | 322/73 |
| 3,257,605 A | * | 6/1966 | Hysler et al. | 322/28 |
| 3,302,097 A | * | 1/1967 | Bobo et al. | 322/25 |
| 3,435,326 A | * | 3/1969 | Zechlin | 322/25 |
| 3,515,970 A | * | 6/1970 | Weiser | 318/249 |
| 3,710,062 A | * | 1/1973 | Peters, Jr. | 219/627 |
| 3,720,194 A | * | 3/1973 | Mallory, Jr. | 123/599 |
| 3,887,781 A | * | 6/1975 | Peters, Jr. | 219/627 |

(Continued)

FOREIGN PATENT DOCUMENTS

JP    57-193999 A    11/1982

(Continued)

*Primary Examiner* — T. C. Patel
*Assistant Examiner* — Pedro J Cuevas
(74) *Attorney, Agent, or Firm* — Sughrue Mion, PLLC

(57) ABSTRACT

An output voltage controller for an AC vehicle generator is proposed. The output voltage controller can easily suppress variation in rectified output voltage due to a switching surge without using a slope generation circuit in a voltage adjustment circuit. An excitation circuit that excites a field coil 13 includes a circulation element 31, a semiconductor switch element 33, an inductor 35, and transient voltage absorption means 40. The circulation element 31 is connected in parallel to the field coil 13. The semiconductor switch element 33 is connected in series with the field coil 13 and turned on and off by a voltage adjustment circuit 60. The inductor 35 is connected in series with the field coil 13 and the semiconductor switch element 33. The transient voltage absorption means 40 absorbs a transient voltage generated in the inductor 35 in association with the switching of the semiconductor switch element 33 between ON and OFF.

9 Claims, 2 Drawing Sheets

U.S. PATENT DOCUMENTS

| | | | | |
|---|---|---|---|---|
| 3,942,097 A * | 3/1976 | Itoh et al. | | 322/28 |
| 3,953,783 A * | 4/1976 | Peters, Jr. | | 363/124 |
| 4,141,613 A * | 2/1979 | Mori et al. | | 322/28 |
| 4,151,387 A * | 4/1979 | Peters, Jr. | | 219/626 |
| 4,258,307 A * | 3/1981 | Mori et al. | | 322/28 |
| 4,297,631 A * | 10/1981 | Nicol et al. | | 320/123 |
| 4,306,184 A * | 12/1981 | Iwaki et al. | | 322/99 |
| 4,328,427 A | 5/1982 | Bond | | 290/3 |
| 4,346,338 A * | 8/1982 | Nakamoto et al. | | 322/28 |
| 4,361,796 A * | 11/1982 | Akita et al. | | 322/99 |
| 4,362,982 A * | 12/1982 | Akita et al. | | 320/123 |
| 4,590,415 A * | 5/1986 | Iwaki et al. | | 320/123 |
| 4,636,706 A * | 1/1987 | Bowman et al. | | 322/28 |
| 4,665,354 A * | 5/1987 | Sada et al. | | 320/123 |
| 4,940,928 A * | 7/1990 | Nishimura | | 322/28 |
| 4,945,277 A * | 7/1990 | Iwatani et al. | | 340/455 |
| 4,985,670 A * | 1/1991 | Kaneyuki et al. | | 322/28 |
| 5,038,728 A | 8/1991 | Yoshida et al. | | 123/198 R |
| 5,059,886 A * | 10/1991 | Nishimura et al. | | 322/28 |
| 5,079,496 A * | 1/1992 | Pierret et al. | | 322/28 |
| 5,080,059 A | 1/1992 | Yoshida et al. | | 123/198 R |
| 5,089,766 A * | 2/1992 | Iwatani | | 322/25 |
| 5,132,605 A * | 7/1992 | Boella et al. | | 322/99 |
| 5,144,220 A * | 9/1992 | Iwatani et al. | | 322/28 |
| 5,376,876 A * | 12/1994 | Bauser et al. | | 322/28 |
| 5,656,918 A * | 8/1997 | Pearman et al. | | 290/23 |
| 5,675,237 A * | 10/1997 | Iwatani | | 322/28 |
| 6,014,016 A * | 1/2000 | Maruyama et al. | | 322/28 |
| 6,140,729 A * | 10/2000 | Pollock et al. | | 310/166 |
| 6,140,915 A * | 10/2000 | Iwatani | | 340/438 |
| 6,344,734 B1* | 2/2002 | Iwatani et al. | | 322/28 |
| 6,384,551 B1* | 5/2002 | Watanabe | | 318/139 |
| 6,392,577 B1* | 5/2002 | Swanson et al. | | 341/144 |
| 6,462,517 B2* | 10/2002 | Asada | | 322/28 |
| 6,483,277 B1* | 11/2002 | Harmon | | 322/28 |
| 6,522,106 B2* | 2/2003 | Matsumoto et al. | | 322/28 |
| 6,717,385 B2* | 4/2004 | Asada et al. | | 322/24 |
| 6,734,653 B2* | 5/2004 | Taniguchi et al. | | 322/24 |
| 6,812,675 B2* | 11/2004 | Okamoto et al. | | 322/28 |
| 6,815,933 B2* | 11/2004 | Taniguchi et al. | | 322/28 |
| 6,831,445 B2* | 12/2004 | Taniguchi | | 322/28 |
| 6,943,532 B1* | 9/2005 | Kouwa et al. | | 322/28 |
| 7,304,478 B2* | 12/2007 | Tsuda et al. | | 324/322 |
| 7,443,143 B2* | 10/2008 | Sasaki et al. | | 322/24 |
| 2005/0248350 A1* | 11/2005 | Tsuda et al. | | 324/322 |

FOREIGN PATENT DOCUMENTS

| | | |
|---|---|---|
| JP | 64-20000 A | 1/1989 |
| JP | 1-295630 A | 11/1989 |
| JP | 2002-125399 A | 4/2002 |

* cited by examiner

OUTPUT VOLTAGE CONTROLLER FOR AC VEHICLE GENERATOR

TECHNICAL FIELD

The present invention relates to an output voltage controller for an AC vehicle generator equipped in a vehicle such as an automobile.

BACKGROUND ART

An AC vehicle generator of this type includes an armature coil and a field coil, and is driven by a motor, such as an engine equipped in the vehicle, so that an AC output voltage is generated in the armature coil. The AC vehicle generator is connected to a rectifier, which produces a rectified output voltage obtained by rectifying the AC output voltage generated in the armature coil in the AC vehicle generator. The rectified output voltage charges a battery equipped in the vehicle and supplies electricity to various electrical loads in the vehicle.

The rectified output terminal of the rectifier is connected to an excitation circuit that excites the field coil. The excitation circuit is connected to a semiconductor switch element that is disposed in series with the field coil. The semiconductor switch element on-off controls the field current flowing through the field coil. A voltage adjustment circuit operating based on the rectified output voltage from the rectifier turns the semiconductor switch element on and off to adjust the rectified output voltage to a level within a predetermined range independent of increase in the rotation speed of the AC vehicle generator driven by the motor. In an output voltage controller for the AC vehicle generator, a switching surge voltage is generated when the semiconductor switch element is switched between ON and OFF. The switching surge voltage varies the rectified output voltage, so that the battery and other electrical loads are undesirably affected.

In Japanese Patent No. 2,529,273, which is related art, the switching surge voltage is called switching noise. The related art proposes a voltage adjustment circuit including a slope generation circuit that generates a slope voltage that linearly changes with time, and the slope generation circuit slowly switches the semiconductor switch element between ON and OFF to reduce the switching noise.

Patent Document 1: Japanese Patent No. 2,529,273

DISCLOSURE OF THE INVENTION

Problem that the Invention is to Solve

However, the output voltage controller for an AC vehicle generator disclosed in the related art requires the special slope generation circuit in the voltage control circuit, so that the voltage adjustment circuit gets complicated.

The invention proposes an improved output voltage controller for an AC vehicle generator that can reduce the switching surge voltage without complicating the voltage adjustment circuit.

Means for Solving the Problem

The output voltage controller for an AC vehicle generator according to the invention is an output voltage controller for an AC vehicle generator including an armature coil and a field coil and driven by a motor equipped in the vehicle so that an AC output voltage is generated in the armature coil. The output voltage controller includes a rectifier that rectifies the AC output voltage to produce a rectified output voltage, an excitation circuit that excites the field coil by using the rectified output, a circulation element provided in the excitation circuit and connected in parallel to the field coil, a semiconductor switch element provided in the excitation circuit and connected in series with the field coil, a voltage adjustment circuit that turns the semiconductor switch element on and off based on the rectified output voltage and adjusts the rectified output voltage to a level within a predetermined range, an inductor provided in the excitation circuit and connected in series with the field coil and the semiconductor switch element, and transient voltage absorption means provided in the excitation circuit, the transient voltage absorption means absorbing a transient voltage generated in the inductor in association with the switching of the semiconductor switch element between ON and OFF.

Advantage of the Invention

In the output voltage controller for an AC vehicle generator according to the invention, since the excitation circuit includes the inductor connected in series with the field coil and the semiconductor switch element and the transient voltage absorption means for absorbing the transient voltage generated in the inductor in association with the switching of the semiconductor switch element between ON and OFF, a switching surge voltage generated in the field coil can easily be reduced without providing a special slope generation circuit in the voltage adjustment circuit.

BEST MODE FOR CARRYING OUT THE INVENTION

Several embodiments of the invention will be described below with reference to the drawings.

First Embodiment

FIG. 1 is an electric circuit diagram showing a first embodiment of an output voltage controller for an AC vehicle generator according to the invention.

The output voltage controller 100 for an AC vehicle generator of the first embodiment includes an AC vehicle generator 10 and a voltage control unit 20, and supplies electricity to a load circuit 70.

The AC vehicle generator 10 is an AC generator with a rectifier built therein and includes an armature coil 11, a field coil 13, a rectifier 15, and a capacitor 17. The AC vehicle generator 10 is, for example, a rotating-field type three-phase AC generator, and the armature coil 11 includes three-phase coils 11A, 11B, and 11C and is configured as a stator. The three-phase coils 11A, 11B, and 11C are connected in a three-phase star configuration, but may be connected in a three-phase delta configuration in some cases. The field coil 13 is configured as a rotor, and provides a rotating magnetic field to the armature coil 11 based on a field current If flowing through the field coil 13. The field coil 13 is connected between a pair of field terminals 13a and 13b. The armature coil 11 produces a three-phase AC output voltage based on the rotating magnetic field.

The rectifier 15 is built in an enclosure of the AC vehicle generator 10. The rectifier 15 rectifies the three-phase AC output voltage produced in the armature coil 11 and outputs a rectified output voltage Vo. The rectifier 15 is configured as a three-phase full-wave rectifier in correspondence to the three-phase coils 11A, 11B, and 11C, and includes three positive-side diodes 15p, three negative-side diodes 15n, and a pair of rectified output terminals 15a and 15b. The rectified output terminal 15a is a positive-side output terminal, and the rectified output terminal 15b is a negative-side output terminal. The rectified output voltage Vo is generated between the rectified output terminals 15a and 15b. The negative-side rectified output terminal 15b is connected to a common potential point E in the vehicle. The capacitor 17 is connected between the rectified output terminal 15a and the common potential point E, and absorbs a surge voltage associated with commutation of the diodes 15p and 15n.

The voltage control unit 20 includes an excitation circuit 30 for the field coil 13 and a voltage adjustment circuit 60. The excitation circuit 30 is connected between the rectified output terminal 15a and the common potential point E. The field coil 13, a circulation element 31, a semiconductor switch element 33, an inductor 35, and transient voltage absorption means 40 are disposed in the excitation circuit 30. The field terminal 13a of the field coil 13 is connected to the rectified output terminal 15a via the inductor 35, and the field terminal 13b is connected to the common potential point E via the semiconductor switch element 33.

The circulation element 31 is disposed in the excitation circuit 30 and connected in parallel to the field coil 13. The circulation element 31 is a diode, through which a circulating current Is flows based on a transient voltage generated in the field coil 13 when the semiconductor switch element 33 is switched from ON to OFF, so that the transient voltage is attenuated. The circulation element 31 includes an anode 31a and a cathode 31c. The anode 31a of the circulation element 31 is directly connected to the field terminal 13b, and the cathode 31c is directly connected to the field terminal 13a. A PN junction diode or a Schottky diode is used as the circulation element 31.

The semiconductor switch element 33 is disposed in the excitation circuit 30 and connected in series with the field coil 13. The semiconductor switch element 33 is connected between the field terminal 13b and the common potential point E. The semiconductor switch element 33 makes on and off an excitation current Ie flowing from the field coil 13 to the common potential point E to adjust the field current If, so that the rectified output voltage Vo is adjusted to a level within a predetermined range independent of increase in the rotation speed of the AC vehicle generator 10 being driven.

An example of the semiconductor switch element 33 is a power MOSFET. The power MOSFET has a source S, a drain D, and a gate G. The source S and the drain D are a pair of main terminals, and the gate G is a control terminal. The drain D is directly connected to the field terminal 13b, and the source S is directly connected to the common potential point E. Instead of the power MOSFET, other power semiconductor switch elements, such as Darlington-connected bipolar power transistors, can be used as the semiconductor switch element 33.

The inductor 35 is disposed in the excitation circuit 30 and connected in series with the field coil 13 and the semiconductor switch element 33. Specifically, the inductor 35 is connected between the field terminal 13a and the rectified output terminal 15a. The inductor 35 reduces the magnitude of the switching surge voltage generated in the field coil 13 when the semiconductor switch element 33 is switched between ON and OFF. For example, an inductor having an inductance ranging from 10 (nH) to 1000 (nH) is used as the inductor 35. Specifically, an inductor having an inductance of 100 (nH) is used.

The transient voltage absorption means 40 is disposed in the excitation circuit 30 and connected to a branch circuit 41 that is disposed in parallel to the field coil 13 and the semiconductor switch element 33. The branch circuit 41 is formed between the field terminal 13a and the source S of the semiconductor switch element 33. Specifically, one end of the transient voltage absorption means is directly connected to the field terminal 13a, and the other end is directly connected to the source S of the semiconductor switch element 33. The transient voltage absorption means 40 absorbs transient voltages vt1 and vt2 generated in the inductor 35 when the semiconductor switch element 33 is switched between ON and OFF.

The transient voltage absorption means 40 is, for example, a capacitor 43. A capacitor having a capacitance ranging from 0.1 ($\mu$F) to 100 ($\mu$F) is used as the capacitor 43. Specifically, a capacitor having a capacitance ranging from 0.5 ($\mu$F) to 5 ($\mu$F) is used.

The voltage adjustment circuit 60 includes a voltage detection circuit 61 and a comparator circuit 63. The voltage detection circuit 61 is connected to the rectified output terminal 15a. The voltage detection circuit 61 filters the rectified output voltage Vo and produces a detection voltage Vd proportional to the rectified output voltage Vo. The comparator circuit 63 has a negative input 63a, a positive input 63b and an output 63c. The detection voltage Vd is supplied from the voltage detection circuit 61 to the negative input 63a. A reference voltage Vref is supplied to the positive input 63b. The output 63c is connected to the gate G of the semiconductor switch element 33 and supplies a control voltage Vc thereto.

The comparator circuit 63 in the voltage adjustment circuit 60 compares the detection voltage Vd with the reference voltage Vref, and sets the control voltage Vc to a high level when the detection voltage Vd is smaller than the reference voltage Vref. The high-level control voltage Vc turns the semiconductor switch element 33 on. When the detection voltage Vd becomes equal to or greater than the reference voltage Vref, the control voltage Vc is set to a low level, so that the semiconductor switch element 33 is turned off. The voltage adjustment circuit 60 turns the semiconductor switch element 33 on and off according to the control voltage Vc so as to adjust the rectified output voltage Vo to a level within a predetermined range independent of increase in rotation speed of the AC vehicle generator 10 being driven. The rectified output voltage Vo is adjusted to a level within a range centered around a predetermined value of 13.5 (V) when a battery 71 in a load circuit 70 is, for example, a 12 (V) battery.

The load circuit 70 includes the battery 71 equipped in the vehicle and other electrical loads 73 in the vehicle. The electrical loads 73 include, when the motor equipped in the vehicle is an engine, various electrical loads, such as an ignition device of the engine, an intake and exhaust system of the engine, and a starter of the engine, and further include an air conditioner in the vehicle and various lamps in the vehicle. The electrical loads 73 further include a microcomputer that electronically controls electric devices in the vehicle. The microcomputer controls, for example, the ignition device and the intake and exhaust system. The load circuit 70 is connected between the rectified output terminal 15a and the common potential point E. The battery 71 is charged by the rectified output voltage Vo, and the electrical loads 73 receive electricity from the rectified output voltage Vo or the battery 71.

The operation of the voltage control unit 20 will be described in more detail. When the detection voltage Vd from the voltage detection circuit 61 in the voltage adjustment circuit 60 is smaller than the reference voltage Vref, the control voltage Vc from the comparator circuit 63 becomes the high level, so that the semiconductor switch element 33 is turned on. When the semiconductor switch element 33 is ON, the excitation current Ie flows from the rectified output terminal 15a through the inductor 35, the field coil 13, and the drain D and the source S of the semiconductor switch element 33. When the semiconductor switch element 33 is ON, the field current If is equal to the excitation current Ie flowing through the semiconductor switch element 33, that is, If=Ie, and an excitation current Iei flowing through the inductor 35 is also equal to the excitation current Ie flowing through the semiconductor switch element 33, that is, Iei=Ie. In this state, the three-phase AC voltage produced in the armature coil 11 in the AC vehicle generator 10 increases as the rotation speed of the AC vehicle generator 10 being driven increases, so that the rectified output voltage Vo also increases accordingly.

When the detection voltage Vd increases and becomes equal to the reference voltage Vref, the control voltage Vc becomes the low level, so that the semiconductor switch element 33 is switched from ON to OFF. When the semiconductor switch element 33 is OFF, the excitation current Ie flowing through the semiconductor switch element 33 becomes zero, that is Ie=0. When the semiconductor switch element 33 is OFF, the field current If is equal to the circulating current Is, that is, If=Is. The field current If decreases as the circulating current Is is attenuated, so that the magnitude of the rotating magnetic field decreases in the AC vehicle generator 10. Then, the AC output voltage at the armature coil 11 decreases, and the rectified output voltage Vo also decreases.

When the semiconductor switch element 33 is switched from ON to OFF, the field current If in the field coil 13 will not instantly become zero, but the potential at the field terminal 13b increases. Then, the circulation element 31 is conducting, so that the field current If, which is now the circulating current Is that circulates from the field terminal 13b of the field coil 13 through the anode 31a and the cathode 31c of the circulation element 31 and the field terminal 13a to the field coil 13, flows through the field coil 13. The circulating current Is is gradually attenuated with time due to the resistance of the field coil 13 and the forward voltage of the circulation element 31.

When the semiconductor switch element 33 is ON, the field current If is equal to the excitation current Ie, which flows from the rectified output terminal 15a in the AC generator 10 through the field coil 13 and the semiconductor switch element 33. When the semiconductor switch element 33 is switched from ON to OFF, the excitation current Ie from the AC generator 10 to the field coil 13 is blocked, and the field current If in the field coil 13 becomes the circulating current Is. Therefore, the output current flowing from the rectified output terminal 15a in the AC generator 10 will abruptly decrease by the amount of the excitation current Ie. However, the rotation speed of the AC generator 10 being driven, the field current If, the electrical loads 73, and the state of the battery 71 will not instantly change but remain fixed at the instant when the semiconductor switch element 33 is switched from ON to OFF. Therefore, the change in the output current from the AC generator 10 results in the change in generated voltage, and appears as a surge voltage in the rectified output voltage Vo at the rectified output terminal 15a.

When the rectified output voltage Vo decreases and hence the detection voltage Vd from the voltage detection circuit 61 in the voltage adjustment circuit 60 becomes smaller than the reference voltage Vref, the control voltage Vc from the comparator circuit 63 becomes the high level, so that the semiconductor switch element 33 is switched from OFF to ON and hence the semiconductor switch element 33 is again ON. When the semiconductor switch element 33 is switched from OFF to ON, the field current If in the field coil 13 does not instantly change, but gradually increases according to the time constant determined by the voltage between the field terminals 13a and 13b of the field coil 13 as well as the inductance and resistance of the field coil 13.

When the semiconductor switch element 33 is OFF, the circulating current Is flowing through the field coil 13 gradually decreases with time. In general, however, before the circulating current Is becomes zero, the rectified output voltage Vo decreases and the semiconductor switch element 33 is again switched to ON. Upon this action, the field current If in the field coil 13 will not instantly increase from the value of the circulating current Is. Instead, because the semiconductor switch element 33 is ON, a circuit connecting the rectified output terminal 15a through the field coil 13 and the semiconductor switch element 33 to the common potential point E is formed, so that the excitation current Ie flows therethrough. Therefore, the output current from the AC generator 10 abruptly increases by the amount of the excitation current Ie. However, since the rotation speed of the AC generator 10 being driven, the field current If, the electrical loads 73, and the state of the battery 71 will not instantly change but remain fixed at the instant when the semiconductor switch element 33 is switched from OFF to ON, the increase in output current from the AC generator 10 results in the change in generated voltage, and appears as a surge voltage in the rectified output voltage Vo at the rectified output terminal 15a.

The first embodiment is characterized in that the inductor 35 and the transient voltage absorption means 40 are disposed in the excitation circuit 30. The inductor 35 and the transient voltage absorption means 40 serve to reduce the rate of change in the output current from the AC generator 10 associated with the switching of the semiconductor switch element 33 between ON and OFF and hence reduce the surge voltage that appears in the rectified output voltage Vo at the rectified output terminal 15a.

When the semiconductor switch element 33 is switched from ON to OFF, the excitation current Ie flowing through the semiconductor switch element 33 is blocked, that is, Ie=0, but the excitation current Iei flowing through the inductor 35 will not instantly become zero because of the inductance of the inductor 35. The inductor 35 acts to prevent the excitation current Iei from the rectified output terminal 15a to the inductor 35 from instantly being zero but gradually reduce the rate of the change in the excitation current Iei. Therefore, the rate of change in the output current from the AC generator 10 decreases, so that the surge voltage that appears in the rectified output voltage Vo at the rectified output terminal 15a can be reduced.

When the semiconductor switch element 33 is switched from ON to OFF, the transient voltage vt1, the polarity of which on the side of the field terminal 13a is positive, is generated in the inductor 35. The capacitor 43 that forms the transient voltage absorption means 40 is charged by the transient voltage vt1 and gradually reduces the excitation current Iei flowing through the inductor 35. As a result, the magnitude of the transient voltage vt1 also decreases. The transient voltage vt1 is thus absorbed in the transient voltage absorption means 40, so that the transient voltage vt1 will not concentrate at the semiconductor switch element 33 that has been turned off, and hence the semiconductor switch element 33 will not be exposed to the transient voltage vt1. It is therefore unnecessary to increase the withstand voltage of the semiconductor switch element 33, and a semiconductor switch element 33 with a more lower withstand voltage can be used.

The inductor 35 prevents abrupt change in the excitation current Iei flowing from the inductor 35 to the field coil 13 and reduces the surge voltage that appears at the rectified output terminal 15a when the semiconductor switch element 33 is switched from OFF to ON. When the semiconductor switch element 33 is OFF, the circulating current Is circulates through the field coil 13 and the circulation element 31, and the circulating current Is becomes the field current If, which gradually decreases with time. The excitation current Iei in the inductor 35 either becomes zero or gradually decreases toward zero when the semiconductor switch element 33 is switched to OFF. When the semiconductor switch element 33 is switched from OFF to ON, the excitation current Ie flows through the semiconductor switch element 33, and the field current If increases. At the same time, the excitation current Iei in the inductor 35 increases toward the value of the field current If, but the excitation current Iei flowing through the inductor 35 will not instantly increase. The inductor 35 thus reduces the rate of change in the output current from the AC generator 10, so that the surge voltage that appears at the rectified output terminal 15a can be reduced.

When the semiconductor switch element 33 is switched from OFF to ON, the transient voltage vt2 having a polarity opposite to the transient voltage vt1 is generated in the inductor 35. However, the capacitor 43 that forms the transient voltage absorption means 40 discharges through the field coil 13 and the semiconductor switch element 33 that has been turned on, and gradually increases the excitation current Iei that flows into the inductor 35. As a result, the magnitude of the transient voltage vt2 is reduced. The transient voltage vt2 is thus also absorbed in the transient voltage absorption means 40 and hence will not affect the semiconductor switch element 33. Part of the discharge current from the capacitor 43 flows from the cathode 31c to the anode 31a of the circulation element 31 as a reverse recovery current in the circulation element 31, so that the circulation element 31 is turned off.

In the first embodiment, use of a Schottky diode as the circulation element 31 allows reduction in the reverse recovery current as compared to the case where a PN junction diode is used, so that the capacitance of the capacitor 43 can be reduced. Specifically, when the semiconductor switch element 33 is switched from OFF to ON, the circulation element 31, which serves to cause the circulating current Is to flow when the semiconductor switch element 33 is OFF, receives an opposite polarity voltage due to a switching surge voltage vs2 and recovers its OFF state. The use of a Schottky diode, which requires a smaller reverse recovery current to recover the OFF state, allows reduction in the discharge current flowing from the capacitor 43 into the circulation element 31, so that the capacitance of the capacitor 43 can be reduced accordingly. A smaller capacitance of the capacitor 43 allows reduction of the capacitor 43 in size, so that the circuit parts that form the excitation circuit 30 can be reduced in size.

As described above, in the first embodiment, the provision of the inductor 35 and the transient voltage absorption means 40 in the excitation circuit 30 allows reduction in the rate of change in the excitation current Iei when the semiconductor switch element 33 is switched from ON to OFF and when the semiconductor switch element 33 is switched from OFF to ON. Therefore, the surge voltage that appears in the rectified output voltage Vo can easily be suppressed without providing a special slope generation circuit in the voltage adjustment circuit 60. Since the slope generation circuit reduces switching surge voltage by slowly turning the semiconductor switch element 33 on and off, the heat generated in the semiconductor switch element 33 increases. However, in the first embodiment using the inductor 35 and the transient voltage absorption means 40, the semiconductor switch element 33 will not slowly be turned on or off, so that the heat generated in the semiconductor switch element 33 will not increase.

Further, the capacitor 43 that forms the transient voltage absorption means 40 can reduce the magnitudes of the transient voltages vt1 and vt2. Since the capacitor 43 is disposed in the branch circuit 41 connected parallel to the field coil 13 and the semiconductor switch element 33, the transient voltage vt1 generated in the inductor 35 will not concentrate at the semiconductor switch element 33. It is therefore unnecessary to increase the withstand voltage of the semiconductor switch element 33, and a semiconductor switch element 33 with a more lower withstand voltage can be used.

Use of an inductor having an inductance greater than 100 (nH) as the inductor 35 allows further reduction in the magnitude of the switching surge voltage. In this case, since the transient voltages vt1 and vt2 generated in the inductor also become larger, it is desirable to use a capacitor 43 having a much larger capacitance than 0.5 ($\mu$F) to 5 ($\mu$F) and a semiconductor switch element 33 having a more lower withstand voltage.

Second Embodiment

FIG. 2 is an electric circuit diagram showing a second embodiment of an output voltage controller for an AC vehicle generator according to the invention.

In the output voltage controller 100A for an AC vehicle generator according to the second embodiment, the voltage control unit 20 includes an excitation circuit 30A, which is a modified version of the excitation circuit 30 in the first embodiment, and the voltage adjustment circuit 60. In the second embodiment, the excitation circuit 30A includes the circulation element 31, the semiconductor switch element 33, and the inductor 35 in the first embodiment as well as a capacitor 50, a first diode 52, a first resistor 53, a second diode 55, and a second resistor 56. The capacitor 50 forms transient voltage absorption means 40 in the second embodiment. Other portions are configured in the same manner as the first embodiment.

In the excitation circuit 30A of the second embodiment, the capacitor 50 is disposed in a branch circuit 51 that is connected in parallel to the semiconductor switch element 33. The branch circuit 51 is formed between the drain D and the source S of the semiconductor switch element 33. Specifically, the drain D of the semiconductor switch element 33 is connected to one end of the capacitor 50 via the first diode 52 and the first resistor 53, and the other end of the capacitor 50 is directly connected to the source S of the semiconductor switch element 33 and to the common potential point E. As in the case of the capacitor 43 in the first embodiment, a capacitor having a capacitance of 0.1 ($\mu$F) to 100 ($\mu$F) is used as the capacitor 50. Specifically, a capacitor having a capacitance of 0.5 ($\mu$F) to 5 ($\mu$F) is used.

The first diode 52 is formed of, for example, a PN junction diode and includes an anode 52a and a cathode 52c. In the branch circuit 51, the first diode 52 is connected between the drain D of the semiconductor switch element 33 and the capacitor 50 and in series with the capacitor 50. Specifically, the anode 52a of the first diode 52 is directly connected to the drain D of the semiconductor switch element 33, and the cathode 52c of the first diode 52 is connected to the capacitor 50 via the first resistor 53. The first resistor 53 is also connected in series with the capacitor 50 in the branch circuit 51. The first resistor 53 has a small resistance value, for example, ranging from 0.1 ($\Omega$) to 10 ($\Omega$), specifically 1 ($\Omega$).

The second diode 55 is connected between the capacitor 50 and the field terminal 13a. The second diode 55 is formed of, for example, a PN junction diode and includes an anode 55a and a cathode 55c. In terms of polarity, the second diode 55 is connected between the capacitor 50 and the field terminal 13a in such a way that the anode 55a of the second diode 55 is directly connected to the capacitor 50 and the cathode 55c of the second diode 55 is directly connected to the field terminal 13a.

The second resistor 56 is disposed in a branch circuit 57 that is connected in parallel to the first diode 52 and the first resistor 53, which are connected in series. The second resistor 56 has a larger resistance than that of the first resistor 53, and the resistance value of the second resistor 56 ranges from 1 (kΩ) to 100 (kΩ), specifically 10 (kΩ).

In the second embodiment as well, the inductor 35 and the transient voltage absorption means 40 that is formed of the capacitor 50 serve to reduce the rate of change in the excitation current Iei flowing from the rectified output terminal 15a to the field coil 13 and reduce the surge voltage that appears in the rectified output voltage Vo in response to the change in the output current from the AC generator 10. The inductor 35 thus serves to reduce the surge voltage generated at the rectified output terminal 15a as in the first embodiment. The transient voltage absorption means 40 reduces the magnitudes of the transient voltages vt1 and vt2 generated in the inductor 35 and absorbs the transient voltage generated in the field coil 13 as in the first embodiment.

When the semiconductor switch element 33 is switched from ON to OFF, the transient voltage vt1 is generated in the inductor 35, and the capacitor 50 is charged by the transient voltage vt1 via the field coil 13, the first diode 52, and the first resistor 53. The capacitor 50 absorbs the transient voltage vt1 and gradually reduces the excitation circuit Iei flowing through the inductor 35, so that the magnitude of the transient voltage vt1 decreases. Since the transient voltage vt1 bypasses the semiconductor switch element 33 and charges the capacitor 50, the transient voltage vt1 will not concentrate at the semiconductor switch element 33 that has been turned off. As a result, it is unnecessary to increase the withstand voltage of the semiconductor switch element 33, and a semiconductor switch element 33 with a more lower withstand voltage can be used. Since the inductor 35 gradually changes the excitation circuit Iei flowing through the inductor 35, the change in the rectified output voltage Vo associated with the change in the output current from the AC generator 10 can be reduced.

When the semiconductor switch element 33 is switched from OFF to ON, the transient voltage vt2 is generated in the inductor 35, and the transient voltage vt2 is also absorbed in the capacitor 50. In response to the generation of the transient voltage vt2, the capacitor 50 starts discharge through the second diode 55, the field coil 13, and the semiconductor switch element 33. The discharge current from the capacitor 50 gradually increases the excitation circuit Iei flowing into the inductor 35. As a result, the rate of change in the output current from the AC generator 10 is reduced, and hence the surge voltage that appears in the rectified output voltage Vo can be suppressed.

In the second embodiment, the first diode 52 is connected to the branch circuit 51 in series with the capacitor 50. In terms of polarity, the anode 52a of the first diode 52 is connected to the drain D of the semiconductor switch element 33. Therefore, when the semiconductor switch element 33 is switched from ON to OFF and the transient voltage vt1 generated in the inductor 35 charges the capacitor 50, the first diode 52 presents a small forward impedance to the charging current to the capacitor 50, allowing the capacitor 50 to be charged. When the semiconductor switch element 33 is switched from OFF to ON and the capacitor 50 discharges through the second diode 55, the field coil 13, and the semiconductor switch element 33, the large, reverse-direction impedance of the first diode 52 blocks the discharge current from the capacitor 50 from flowing through the first resistor 53 to the semiconductor switch element 33 and hence prevents the capacitor 50 from instantly discharging. Since the first diode 52 blocks the discharge current from the capacitor 50, the capacitance of the capacitor 50 can be reduced, and hence the size of the capacitor 50 can be reduced.

The first resistor 53 reduces the charging current to the capacitor 50. Specifically, when the semiconductor switch element 33 is switched from ON to OFF and the transient voltage vt1 charges the capacitor 50 through the field coil 13, the first diode 52 and the first resistor 53, the first resistor 53 reduces the charging current. Since the first resistor 53 reduces the charging current to the capacitor 50, the capacitance of the capacitor 50 can be reduced, and hence the size of the capacitor 50 can be reduced.

When the semiconductor switch element 33 is switched from OFF to ON and the transient voltage vt2 is generated in the inductor 35, the second diode 55 presents a small forward impedance to the discharge current coming from the capacitor 50 and flowing through the field coil 13 to the semiconductor switch element 33, allowing the capacitor 50 to discharge. Since the discharge of the capacitor 50 gradually increases the excitation circuit Iei flowing into the inductor 35, the rate of change in the output current from the AC generator 10 is reduced, and hence the surge voltage that appears in the rectified output voltage Vo can be suppressed.

In the second embodiment as well, part of the discharge current from the capacitor 50 becomes a reverse recovery current flowing from the cathode 31c to the anode 31a of the circulation element 31. Use of a Schottky diode as the circulation element 31 allows reduction in the reverse recovery current as compared to the case where a PN junction diode is used, so that the capacitance of the capacitor 50 can be reduced. Specifically, when the semiconductor switch element 33 is switched from OFF to ON, the circulation element 31, which serves to cause the circulating current Is to flow when the semiconductor switch element 33 is OFF, receives an opposite polarity voltage due to a switching surge voltage vs2 and recovers its OFF state. The use of a Schottky diode, which requires a smaller reverse recovery current to recover the OFF state, allows reduction in the discharge current flowing from the capacitor 50 into the circulation element 31, so that the capacitance of the capacitor 50 can be reduced accordingly. A smaller capacitance of the capacitor 50 allows reduction of the capacitor 50 in size, so that the circuit parts that form the excitation circuit 30A can be reduced in size.

In the second embodiment, the second resistor 56 discharges the remaining charge in the capacitor 50 to the semiconductor switch element 33 when the semiconductor switch element 33 is ON. Since the second resistor 56 allows discharge of the remaining charge in the capacitor 50, the capacitor 50, even when having a smaller capacitance, can accumulate more charge when the semiconductor switch element 33 is switched to OFF next time and the transient voltage vt1 is generated in the inductor 35.

INDUSTRIAL APPLICABILITY

The output voltage controller for an AC vehicle generator according to the invention can be used with an AC generator equipped in an automobile and the like.

Figure 1:
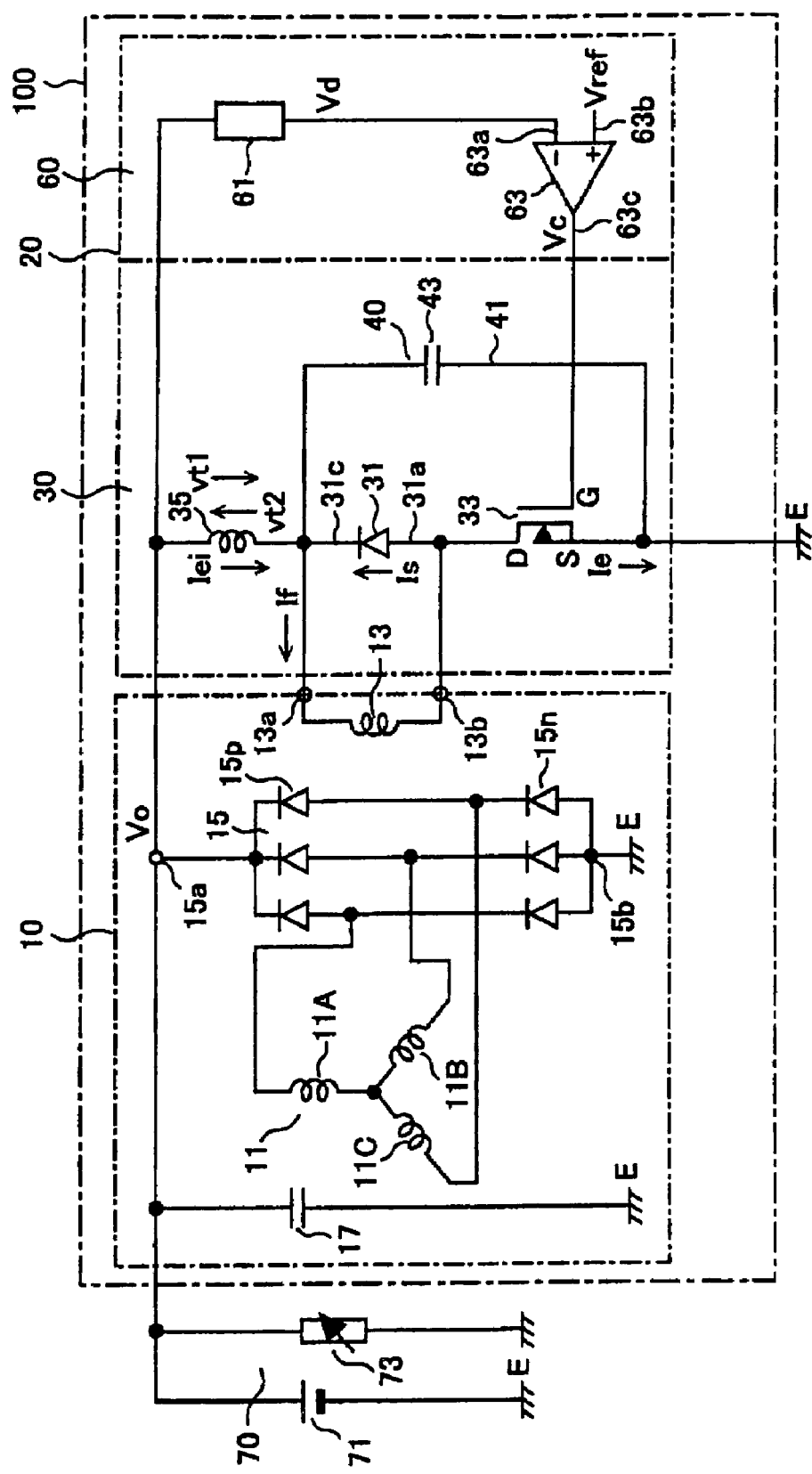
FIG. 1 is an electric circuit diagram showing a first embodiment of an output voltage controller for an AC vehicle generator according to the invention.
Figure 2:
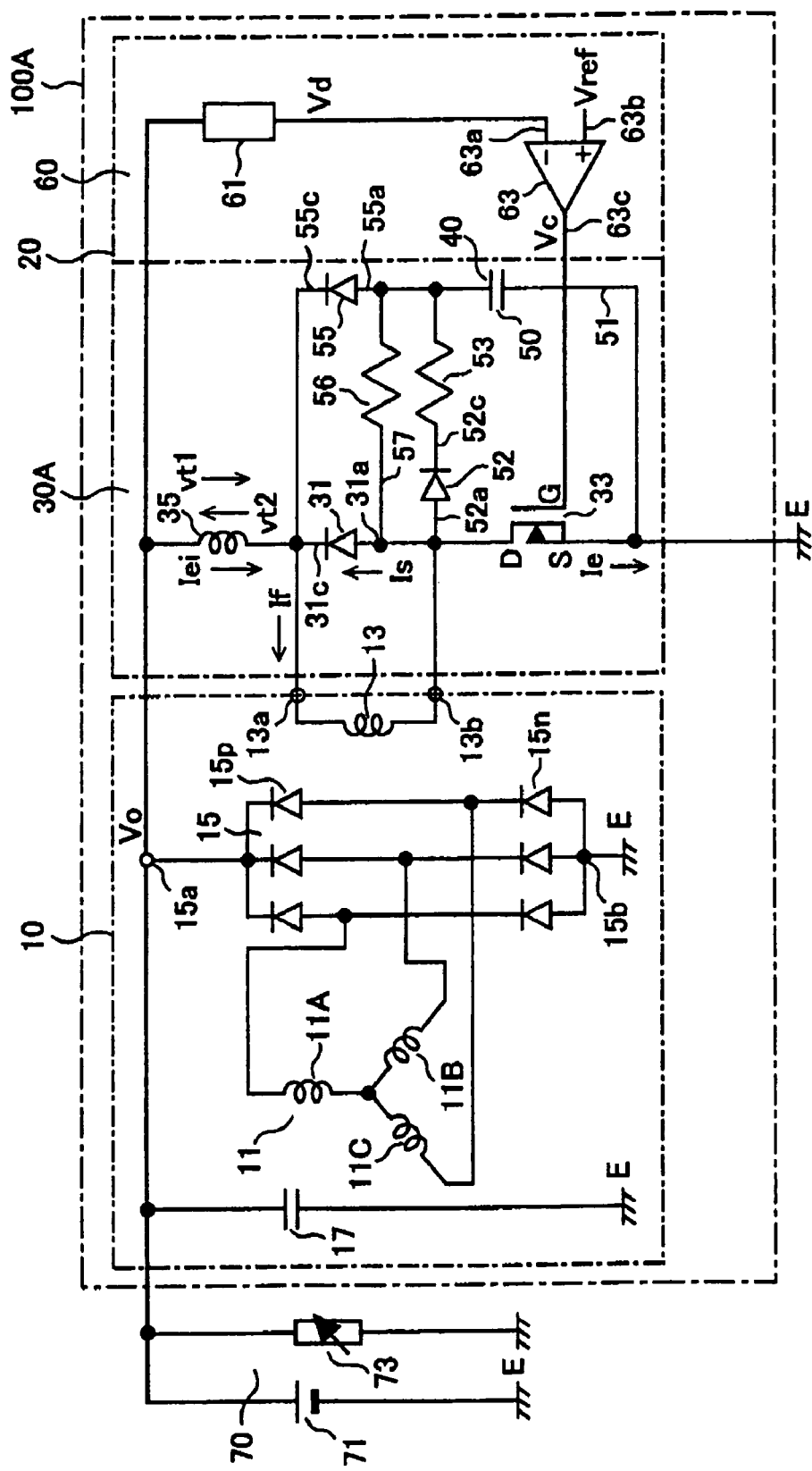
FIG. 2 is an electric circuit diagram showing a second embodiment of an output voltage controller for an AC vehicle generator according to the invention.

The invention claimed is:

1. An output voltage controller for an AC vehicle generator including an armature coil and a field coil and driven by a motor equipped in the vehicle so that an AC output voltage is generated in the armature coil, the output voltage controller comprising:
   a rectifier that rectifies the AC output voltage to produce a rectified output voltage;
   an excitation circuit that excites the field coil by using the rectified output voltage;
   a circulation element provided in the excitation circuit and connected in parallel to the field coil;
   a semiconductor switch element provided in the excitation circuit and connected in series with the field coil;
   a voltage adjustment circuit that turns the semiconductor switch element on and off based on the rectified output voltage and adjusts the rectified output voltage to a level within a predetermined range;
   an inductor provided in the excitation circuit and connected in series with the field coil and the semiconductor switch element; and
   transient voltage absorption means provided in the excitation circuit, the transient voltage absorption means absorbing a transient voltage generated in the inductor in association with the switching of the semiconductor switch element between ON and OFF.

2. The output voltage controller for an AC vehicle generator according to claim 1,
   wherein the transient voltage absorption means is a capacitor.

3. The output voltage controller for an AC vehicle generator according to claim 2,
   wherein the circulation element is a Schottky diode.

4. The output voltage controller for an AC vehicle generator according to claim 2,
   wherein the capacitor is connected to a branch circuit that is disposed in parallel to the field coil and the semiconductor switch element, and
   when the semiconductor switch element is switched from ON to OFF, the transient voltage generated in the inductor charges the capacitor.

5. The output voltage controller for an AC vehicle generator according to claim 2,
   wherein the capacitor is connected to a branch circuit that is disposed in parallel to the semiconductor switch element, and
   when the semiconductor switch element is switched from ON to OFF, the transient voltage generated in the inductor charges the capacitor.

6. The output voltage controller for an AC vehicle generator according to claim 5,
   wherein the output voltage controller further comprises a first diode connected to the branch circuit in series with the capacitor, and
   the first diode is connected in such a way that the polarity thereof allows the capacitor to be charged by the transient voltage when the semiconductor switch element is switched from ON to OFF.

7. The output voltage controller for an AC vehicle generator according to claim 6, further comprising a first resistor connected to the branch circuit in series with the capacitor and the first diode.

8. The output voltage controller for an AC vehicle generator according to claim 7, further comprising a second resistor connected to a branch circuit that is disposed in parallel to the first diode and the first resistor.

9. The output voltage controller for an AC vehicle generator according to claim 5,
   wherein that the output voltage controller further comprises a second diode disposed in the excitation circuit, and
   the second diode is connected in such a way that the polarity thereof allows the capacitor to discharge through the field coil and the semiconductor switch element when the semiconductor switch element is switched from OFF to ON.

* * * * *